United States Patent
Zhang et al.

(10) Patent No.: US 10,438,112 B2
(45) Date of Patent: Oct. 8, 2019

(54) METHOD AND APPARATUS OF LEARNING NEURAL NETWORK VIA HIERARCHICAL ENSEMBLE LEARNING

(71) Applicants: Qiang Zhang, Pasadena, CA (US); Zhengping Ji, Temple City, CA (US); Lilong Shi, Pasadena, CA (US); Ilia Ovsiannikov, Studio City, CA (US)

(72) Inventors: Qiang Zhang, Pasadena, CA (US); Zhengping Ji, Temple City, CA (US); Lilong Shi, Pasadena, CA (US); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 700 days.

(21) Appl. No.: 14/836,901

(22) Filed: Aug. 26, 2015

(65) Prior Publication Data
US 2016/0350649 A1     Dec. 1, 2016

Related U.S. Application Data

(60) Provisional application No. 62/166,627, filed on May 26, 2015.

(51) Int. Cl.
*G06N 3/04* (2006.01)
*G06N 3/08* (2006.01)

(52) U.S. Cl.
CPC ........... *G06N 3/0454* (2013.01); *G06N 3/082* (2013.01); *G06N 3/084* (2013.01); *G06N 3/04* (2013.01)

(58) Field of Classification Search
None
See application file for complete search history.

(56) References Cited

U.S. PATENT DOCUMENTS

| | | |
|---|---|---|
| 7,080,053 B2 | 7/2006 | Adams et al. |
| 2014/0180986 A1 | 6/2014 | Hinton et al. |
| 2015/0006444 A1 | 1/2015 | Tamatsu et al. |

FOREIGN PATENT DOCUMENTS

WO     2005006249 A1     1/2005

OTHER PUBLICATIONS

Bossomaier, et al., Dynamic Suppression of Sensory Detail Saves Energy, International Journal on Advances in Intelligent Systems, vol. 7 No. 1 & 2, 2014, pp. 135-144 (Year: 2014).*

\* cited by examiner

*Primary Examiner* — Wilbert L Starks
(74) *Attorney, Agent, or Firm* — Renaissance IP Law Group LLP

(57) ABSTRACT

A method for configuring a neural network is provided. The method includes: selecting a neural network including a plurality of layers, each of the layers including a plurality of neurons for processing an input and providing an output; and, incorporating at least one switch configured to randomly select and disable at least a portion of the neurons in each layer. Another method in the computer program product is disclosed.

20 Claims, 7 Drawing Sheets

METHOD AND APPARATUS OF LEARNING NEURAL NETWORK VIA HIERARCHICAL ENSEMBLE LEARNING

BACKGROUND

1. Field

The disclosure herein relates to deep neural networks, and in particular, to techniques for training a deep neural network.

2. Description of the Related Art

Deep neural networks, especially, deep convolution neural networks, have gained more and more interests not only from the research community but also from industry, much due to its great success in applications include image classification, object detection, video classification and speech recognition. In these applications and others, significant performance boost over traditional computational methods is observed. In some instances, performance of a deep neural network can exceed that of a human. In a deep convolution neural network (referred to as a CNN), the core is the deeply stacked convolution layers, which can be interlaced by normalization layers and subsampling layers (or pooling layer), where each convolution layer is includes a set of filters (filter bank). The filters can be two-dimensional (2D) filters, such as for image classification; three-dimensional (3D) filters, such as for video classification; or linear (one-dimensional 1D) such as filters for speech recognition.

Commonly, to learn a given neural network, backpropagation is applied. In backpropagation, parameters of the network are learned from training data. In embodiments where the neural network performs image recognition, training data may include a plurality of images. Often during training, the learning process may get stuck in local minimum and is prone to over-fitting due to the huge number of parameters and nonlinearity of the neural network. As a result, dead filters and/or duplicated filters are realized. This leads to inefficient processing when implementing the neural network.

Several techniques have been tried to provide for more effective training. Some of the techniques include using more training data, adding more variation to training data (e.g., by adding some random noise), using more complex networks (e.g., more layers and more filters). Those efforts suffer from several limitations. For example, more training data means much more effort in collecting the training data. Adding more variation creates instability of the neural network due to the randomness. Using a more complex neural network requires much more computational capabilities and increases the potential for over-fitting. One phenomenon of over-fitting is the incorporation of ineffective feature detectors. That is, for example, dead or duplicated feature detectors which do not contribute to the performance of neural network but waste a large number of parameters and therefore slow down processing and impose a general requirement for additional resources.

Thus, what are needed are improved techniques for more effectively learning a deep neural network. The techniques should provide for reducing the existence of dead filters or duplicated filters and lead to more efficient processing.

SUMMARY

In a first embodiment, a method for configuring a neural network is provided. The method includes: selecting a neural network including a plurality of layers, each of the layers including a plurality of feature detectors for processing an input and providing an output; and, incorporating switch mechanisms to select and disable a portion of the feature detectors in each layer.

The plurality of neurons may include at least one of a feature detector and a gradient, and at least one of the feature detectors and the gradients may include a channel. The method may include incorporating at least one connection based switch between respective layers, the connection based switch configured for propagating information from the disabled portion of neurons in one layer to another layer. The method may further include selecting and disabling the portion of neurons, and may further include inputting training data into the neural network and building a trained model of the neural network. This in turn may further include resetting the neural network by enabling the disabled portion of neurons as well as combining a plurality of trained models of the neural network to provide an embodiment of the neural network configured for production. The method may further include testing the neural network configured for production with testing data not contained in the training data. In the method, the layers may include at least one of a convolution layer, a pooling layer, a fully connected layer, and an input. The neural network may include machine executable instructions stored on machine readable media.

In another embodiment, a method for implementing a neural network is provided. The method includes: selecting a neural network including a plurality of layers, each of the layers including a plurality of neurons for processing an input and providing an output, the neural network further including at least one switch configured to randomly select and disable at least a portion of the neurons in each layer; training the neural network by randomly selecting and disabling the portion of neurons in each layer and then inputting training data to build a training model of the neural network; repeating the training to build a plurality of training models; combining the training models to provide a production model of the neural network; and, processing production data with the production model of the neural network.

In some embodiments, at least one of the training, combining, and processing are performed by a server. In some embodiments, the method may further include collecting the production data with a mobile device. The mobile device may be configured to communicate the production data to a remote server. The mobile device may be one of a smart phone, a camera, a tablet computer, a scanner, and a specialized device. The production data may include at least one of image data and auditory data. The processing may provide for at least one of: object recognition, voice recognition, language translation, facial recognition, medical image analysis and handwriting analysis.

In yet another embodiment, a computer program product stored on machine readable media is provided. The computer program product includes machine executable instructions for implementing a neural network by executing a method including: selecting a neural network including a plurality of layers, each of the layers including a plurality of neurons for processing an input and providing an output, the neural network further including connection based switches and/or random switches to select and disable at least a portion of the neurons in each layer; training the neural network by selecting and disabling the portion of neurons in each layer and then inputting training data to build a training model of the neural network; repeating the training to build a plurality of training models; combining the training models to provide a production model of the neural network; and, processing production data with the production model of the neural network.

The computer program product may further include outputting at least one of: object recognition, voice recognition, language translation, facial recognition, medical image analysis and handwriting analysis.

BRIEF DESCRIPTION OF THE DRAWINGS

The features and advantages of the subject matter disclosed herein are apparent from the following description taken in conjunction with the accompanying drawings in which:

FIG. 7A and FIG. 7B, collectively referred to herein as FIG. 7, are representations of filters in the neural network, wherein FIG. 7A depicts traditional filters for a network, and FIG. 7B depicts filters for the neural network according to the teachings herein;

DETAILED DESCRIPTION

Figure 1:
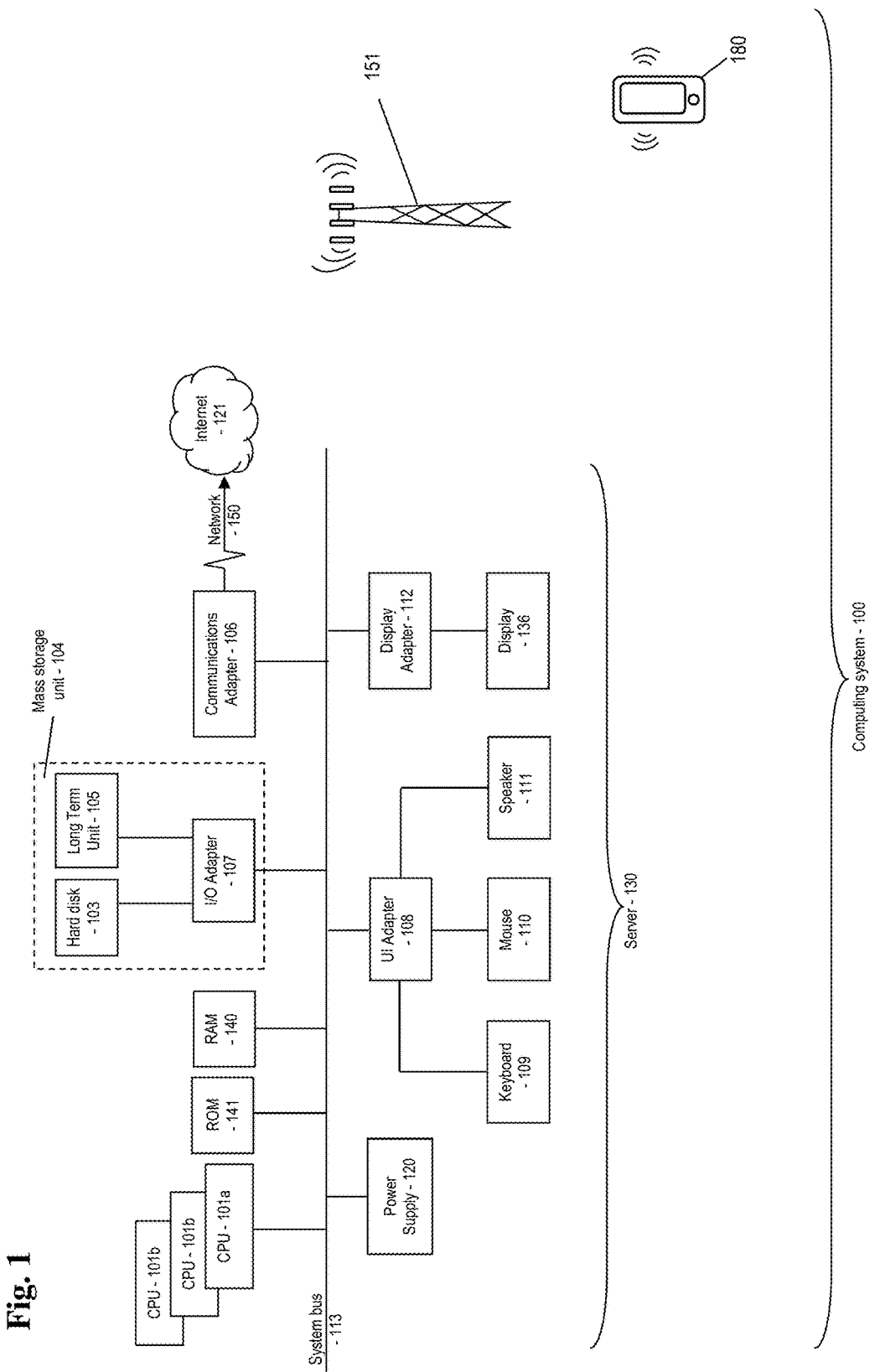
FIG. 1 is a block diagram of computing resources suited for implementing embodiments of neural networks as disclosed herein.

Disclosed herein are techniques for training a neural network. The techniques provide for efficient learning of the neural network, and reduction in the number of dead and/or duplicated filters in the convolutional layers of the neural network. The disclosed technique disables a subset of parameters, which are selected at each layer of the network, based on either of or both of two switch mechanisms: (1) a random switch that provides for selecting and disabling parameters (i.e., neurons along with their weights) randomly; and (2) a connection-based switch that provides for selecting and disabling parameters (i.e., neurons along with their weights) given neurons connection from layer to layer. By disabling a subset of parameters of the neural network, the techniques encourage the remaining parameters to be more effective and robust. That is, application of the techniques disclosed herein results in decreases of the numbers of dead filters or duplicate filters. As a result, the techniques leads to a neural network that provides improved performance over the prior art.

The neural networks trained according to the teachings herein may be used for a variety of computationally complicated tasks. For example, the neural network may be used for object recognition when provided with image data. Object recognition may provide for facial recognition, handwriting analysis, medical image analysis, and other tasks requiring analysis of images to identify objects and features therein, and for a variety of similar tasks. Neural networks may be used for a variety of tasks such as environmental surveillance, to control production and manufacturing, to assist with medical diagnostics, and a variety of other similar processes. The neural network may be used for other applications such as voice recognition, language translation, and other linguistic tasks when provided with auditory data.

In order to provide some context for the teachings herein, some aspects are now introduced.

As discussed herein, the term "neural network" generally refers to software that implements statistical learning algorithms that are of an adaptive nature and are useful in machine learning. The neural network may include a plurality of artificial nodes, known as "neurons," "processing elements," "units," or by other similar terms and which are connected together to form a network which mimics a biological neural network. Generally, a neural network includes sets of adaptive weights (i.e. numerical parameters that are tuned by a learning algorithm), and are capable of approximating non-linear functions of their inputs. The adaptive weights are conceptually connection strengths between neurons, which are activated during training and prediction. Generally, a neural network operates on a principle of non-linear, distributed, parallel and local processing and adaptation. Generally, the first layer is called the "input layer," and the neurons within the layer are called input neurons. The "output layer" contains output neurons. Intermediate layers are called "hidden layers," since the neurons in these layer are neither inputs nor outputs. Neurons may include feature detectors, gradients, and other such components.

In general, "convolution" is a mathematical operation on two functions, f and g, and produces a third function that may be viewed as a modified version of one of the original functions. The third function generally includes area overlap between the two functions as a function of the amount that one of the original functions is translated.

In general, the term "convolutional neural network (CNN)" refers to a type of neural network where the individual neurons are tiled in such a way that they respond to overlapping regions in the visual field. Generally, the convolutional neural network (CNN) will employ local receptive fields, shared weights, and pooling to process imagery. Local receptive fields may be considered as connections of input pixels to a layer of hidden neurons. As an example, each neuron in the first hidden layer corresponds to a small, localized region of the input image. The region of the input image that corresponds to the hidden neuron is called the "local receptive field" for that hidden neuron. Each of the hidden neurons in the first hidden layer use the same weights and bias as the other hidden neurons, and thus have "shared weights." This means that all the neurons in the first hidden layer detect exactly the same feature just in different locations. The resulting map from the input layer is referred to as a "feature map," and the weights defining the feature map as the "shared weights." "Pooling layers" are usually used immediately after convolutional layers. Pooling layers simplify the information in the output from the convolutional layer. That is, a pooling layer takes each feature map output from the convolutional layer and prepares a condensed feature map. One common procedure for pooling is known as "max-pooling." In max-pooling, a pooling unit simply outputs the maximum activation of the input region (output from the feature map).

The deep convolution neural network (CNN) can be described as stacks of convolution layers, interlaced with normalization layer, pooling layer (which down samples the input spatially) and/or layers of other types, with fully connected layers and cost layers (e.g., logistic regression) in the top. Each convolution layer is parameterized by a set of filters, for example, a filter in the first layer which takes an RGB image as input and provides a response. The power of the deep CNN comes from the deeply stacked layers, which starts with simple features (for example, raw RGB image data) and learns more and more complex feature through the layers, where subsequent layers can be used to identify high level semantics.

As discussed herein, the term "filter" or "kernel" generally refers to a layer of connection weights. When using an image as input to the filter, the input includes a small two-dimensional image patch, and the output is then a single unit. Since the filter is applied repeatedly, the resulting connectivity looks like a series of overlapping receptive fields.

As discussed herein, the term "feature detector" generally refers to a set of techniques that learn a transformation of data input and provide a representation that can be used by the neural network.

As discussed herein, the term "subsampling," or "downsampling," generally refers to reducing the overall size of a signal. In the case of two-dimensional filter outputs, such as used for image processing, subsampling can also be thought of as increasing the position invariance of the filters. One technique referred to as "max pooling," involves taking the maximum value in each grid as the value in the reduced matrix. Semantically, this corresponds to changing the question answered by the convolution layer from "how well does this filter apply right here" to "how well does this filter apply to this area." By applying such a max pooling layer in between convolutional layers, spatial abstractness can be increased along with increases in feature abstractness.

As discussed herein, the term "image" refers to a two-dimensional array of digitized image data, however, this is merely illustrative and is not limiting. As discussed herein, images provided to the server may be collected by another device such as a remote input device (such as a camera incorporated into a mobile device) and prepared for training by intermediate tools (such as a software client) and configured to mimic the form of images provided by the client (for example). Images collected by the client may be provided in a digitized form (such as from a camera in the mobile device). In exemplary embodiments, aspects such as dimensions and number of pixels of training images are generally equivalent to the dimensions and number of pixels of production images. Further, merely for purposes of distinguishing training images from other images collected during operation of the client, images used for training the neural network are referred to as "training images." Images collected by the client for subsequent analysis by a given neural network are referred to as "production images" and by other similarly distinct terms.

As discussed herein, the term "production" generally refers to use of a neural network to analyze input data. In contrast, "training" generally refers to sequences involved in developing the neural network for production.

As discussed herein, an "object" or "feature" may appear in or be contained within an image. For example, a car (object) may appear within a picture (image) of a landscape (collection of objects). An example of the feature may include a line, a curve, and intensity, color, and other particular properties of within an image. In some embodiments, the terms object and feature are interchangeable, and generally synonymous.

As discussed herein, the term "server" generally refers to a computing resource that has robust computational resources. Exemplary resources include those important for performing tasks described herein, and may include substantial memory, processing capabilities, data storage and the like. In exemplary embodiments, the server includes a conventional server (such as a blade server) a mainframe, a network of personal computers, or simply a personal computer (PC). A server may be remote from another device, such as a mobile device used for input. One example of an input device is a smartphone.

As discussed herein, the term "mobile device" generally refers to the computing resource that is configured for mobile use. Quite often, a device that is configured as a mobile device will have a reduced set of computational resources. Accordingly, various embodiments of mobile devices may maintain communication with a server to supplement computing capabilities. Examples of mobile devices include: a smart phone, a tablet computer, and/or a specialized device.

As discussed herein, the term "client" generally refers to a computing resource that has a reduced set of computational resources. Exemplary resources include those important for performing tasks described herein, and may include a minimal amount of memory, processing capabilities, data storage and the like. In some embodiments, the client includes imaging capabilities to provide for collection of input images that are input into the neural network. In some embodiments, the client is configured for use on a mobile device and communicates with more robust, complimentary resources that operate on a remote server.

As discussed herein, the terms "program," "software," "application," "add-in," and other similar terms refer to machine executable instructions stored on non-transitory machine readable media. The machine executable instructions provide for execution of a method through control of computing resources and any associated components deemed appropriate.

As discussed herein, the terms "video," "movie," and other similar terms generally refer to a series of images.

In the exemplary embodiments, the methods and apparatus disclosed herein are useful for training a neural network. The neural network is configured for performing object recognition from image data. However, the exemplary embodiments are to be considered as merely illustrative and are not limiting of the teachings herein. Accordingly, the methods and apparatus disclosed may be used equally well for other applications involving use of neural networks.

Referring now to FIG. 1, aspects of an illustrative and non-limiting embodiment of a computing system 100 are depicted. In this example, computing system 100 includes a server 130. The server 130 has one or more central processing units (processors) 101*a*, 101*b*, 101*c*, etc. (collectively or generically referred to as processor(s) 101). Processors 101 are coupled to random access memory (RAM) 140 (also referred to "system memory," or simply as "memory") and various other components via a system bus 113. The computing system 100 may include read only memory (ROM) 141 coupled to the system bus 113. The ROM 141 may include a built-in operating system (BIOS), which controls certain basic functions of computer 100.

FIG. 1 further depicts an input/output (I/O) adapter 107 and a communications adapter 106 coupled to the system bus 113. I/O adapter 107 may include parallel ATA (PATA, also called IDE or EIDE), Serial ATA (SATA), SCSI, Serial Attached SCSI (SAS), and Fibre Channel, or include any other type of interface deemed appropriate. The I/O adapter 107 generally provides for communicating with a hard disk 103 and/or long term storage unit 105 (such as a tape drive) or any other similar component (such as an optical drive). I/O adapter 107, hard disk 103, and long term storage unit 105 (and other similar components as may be included) are collectively referred to herein as mass storage 104.

A communications adapter 106 interconnects system bus 113 with an outside network 150 enabling server 130 to communicate with other systems. The communications adapter 106 may be supportive of at least one of wired and wireless communication protocols. For example, the communications adapter 106 may support protocols such as wired Ethernet, wi-fi (e.g., 802.11 protocols), UMTS, dial-up, active-sync, cellular (using protocols such as, for example, GSM, GPRS, EDGE, CDMA, TDMA, 3G, 4G, and the like). Generally, the communications adapter 106 communicates with network 150, and may communicate (directly or indirectly) with the Internet 121.

The server 130 is powered by a suitable power supply 120. In some embodiments, the power supply 120 includes at least one transformer for receiving alternating current (AC) and transforming the AC into a suitable form of direct current (DC). In other embodiments, the power supply 120 includes at least one battery. The power supply may include appropriate circuitry for receiving and controlling various forms of input power.

Input/output devices are shown as connected to system bus 113 via user interface (UI) adapter 108. A keyboard 109, a pointing device 110 (e.g., a mouse), and speaker 111 may be included and interconnected to system bus 113 via user interface adapter 108. Other user interface components may be included as deemed appropriate.

A display adapter 112 connects display monitor 136 is connected to system bus 113. The display adapter 112 and/or display monitor may be configured with various components, such as a graphics adapter to improve the performance of graphics intensive applications, a video controller, a capacitive (i.e., touch screen) display, and the like. The display monitor 136 may be used to display a user interface.

In some embodiments, adapters 106, 107, 108 and 112 may be connected to one or more input/output (I/O) busses that are connected to system bus 113 via an intermediate bus bridge (not shown). Suitable I/O buses for connecting peripheral devices such as hard disk controllers, network adapters, and graphics adapters may include common protocols, such as the Peripheral Components Interface (PCI) bus.

Generally, the computing system 100 stores machine readable instructions on non-transitory machine readable media (such as in ROM, RAM, or in the mass storage unit 104). The machine readable instructions (which may be referred to herein as "software," as an "application," as a "client, a "process," a "plug-in" and by other similar terms) generally provide for functionality as will be discussed in detail further herein.

The computing system 100 may include additional components. The additional components may serve other functions as well. For example, the computing system 100 may take advantage of or rely upon a third-party communication system 151. For simplicity, the third-party communication system 151 is also referred to herein as a "system operator" 151. Additionally, the computing system 100 may include at least one mobile device 180. The at least one mobile device 180 may include a device such as a smart phone. Illustrative embodiments of smartphone devices include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash.

In illustrative embodiments, the at least one mobile device 180 includes components similar to those found in the server 130. For example, the at least one mobile device 180 includes at least one central processing unit (CPU). The central processing unit (CPU) is connected to or in communication with other components through an internal system bus. Examples of other components within the mobile device 180 include a power supply, memory, software, user controls, a display, a camera (that may be a front facing or a rear facing camera), a lamp, and a communication interface.

The CPU may be an ARM or other processor. The power supply may be from a battery or a source of direct current (DC), such as a transformer coupled to a conventional alternating current (AC) outlet. User controls may include a home button and an on/off switch. The display may include at least one of LCD, LED, OLED, AMOLED, IPS and other technologies. Lamp may be a light emitting diode (LED).

The communication interface may include a wired interface and/or a wireless interface. The wireless interface may include a wireless service processor. Illustrative wireless interfaces may make use of a protocol such as cellular, Bluetooth, Wi-Fi, near field technology (NFC), ZigBee, or other technology. Communication services provided over the wireless communication interface may include Wi-Fi, Bluetooth, Ethernet, DSL, LTE, PCS, 2G, 3G, 4G, LAN, CDMA, TDMA, GSM, WDM and WLAN. The communication interface 23 may include an auditory channel. That is, the communication interface may include a microphone for receiving voice commands, and may further include a speaker. In some embodiments, the speaker may provide an auditory signal when a barcode has been read. The communication interface may further include a status light or other such visual indicators.

The communication interface provides for, among other things, voice communications as well as data communications. The data communications may be used to provide for communication of software and data (such as at least one image; results of analyses, and other such types of data). Communication through the communication interface may be bi-directional or in a single direction.

The mobile device 180 may include additional components such as sensors. Examples of sensors may include an accelerometer that provides for orientation information and a GPS sensor that provides for location information. The mobile device may also include peripheral interface and communication ports.

In some embodiments of the server 130, the machine readable instructions stored therein include drivers configured for communicating with other components. For example, the drivers may enable the server 130 to communicate with the camera and/or sensors of the mobile device 180.

Some of the machine readable instructions stored on non-transitory machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

The computing system 100 may include, or exclude, as appropriate, the foregoing components and other components. For example, other components such as routers, bridges, firewalls, switches, other servers, middleware and other components may be available. Some components may be implemented in software and/or hardware. In some embodiments, the term "server" refers to a software engine running on hardware that may perform other functions as well.

The computing system 100 may include a plurality of computers. For example, in the computing system 100, at least one computer in the plurality may include substantial storage, memory, processors, mass storage and the like. Other devices, such as mobile device 180 may include a reduced set of components. At least one computer in the plurality may be designed with mobility as a primary purpose. For example, memory may replace a hard disk due to a physically compact nature of the memory. Other embodiments of the mobile device 180 include a tablet computer, a scanner, and anyone of a number of specialized devices. Non-limiting examples of specialized devices include application-specific devices designed for machine vision.

A particular computer in the computing system 100 may be purpose-oriented. For example, a computing infrastructure may use one computer principally as a file server (i.e., a data storage device for efficient storing of data within the computing infrastructure), a plurality of other computers as input devices (e.g., as mobile stations operated remotely by users for interfacing with the computing infrastructure), as a console (e.g., a dedicated system for managing the computing infrastructure), and the like.

It should be recognized that some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the computing system 100, and systems making use of the computing system 100, merely provide an environment for the teachings herein and is not to be construed as limiting, but as illustrative of aspects of the computing system 100.

Generally, the computing system 100 implements a software solution that enables users to train and/or operate neural network systems. The computing system 100 may implement third party software systems for various purposes, such as communications, messaging, graphics editing, statistical analyses, and for other such purposes.

Figure 2:
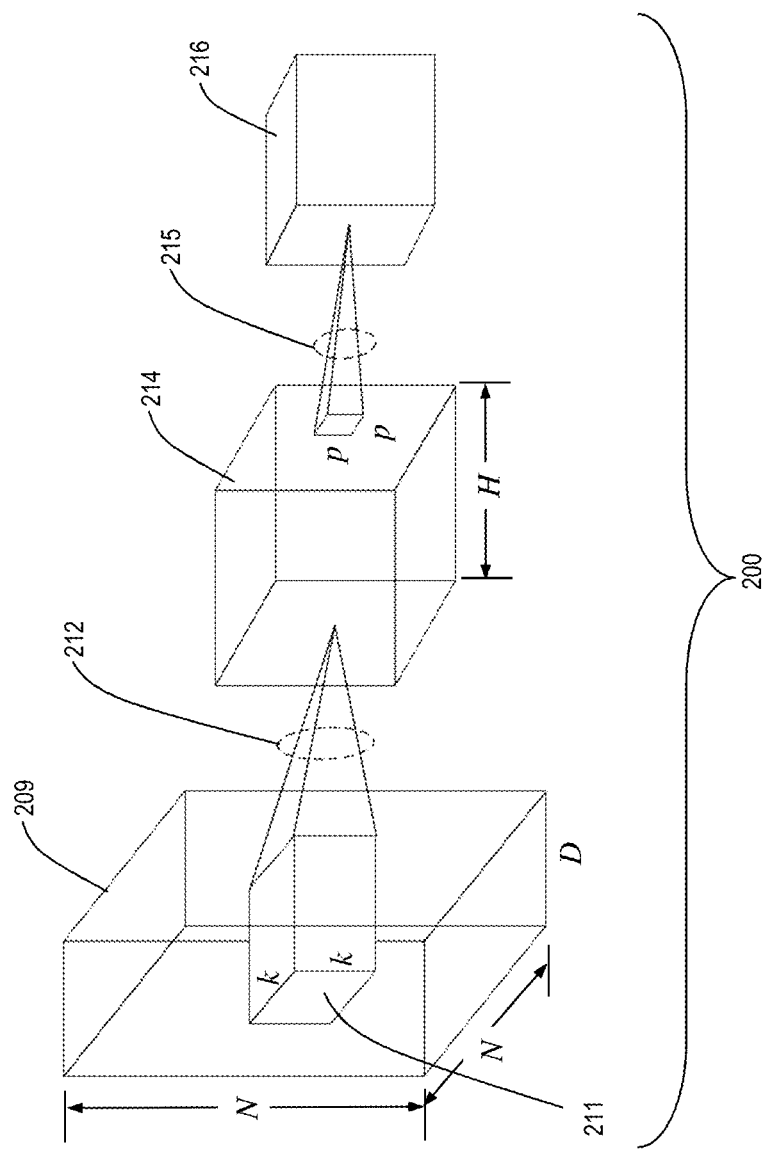
FIG. 2 is diagram depicting generalized aspects of a neural network.

FIG. 2 is a schematic diagram that is an abstraction for illustrating basic aspects of a convolutional neural network (CNN) 200 useful for development of feature detectors and/or for decision making regarding identification of objects. The convolutional neural network (CNN) 200 may be provided as software, such as software that is stored in mass storage unit 104 of the server 130 and/or in data storage of the at least one mobile device 180. The convolutional neural network (CNN) 200 may be built using any application deemed appropriate. One application suited for coding the convolutional neural network (CNN) 200 is Python, which is open source software available from the Python Software Foundation of Beaverton, Oreg. As aspects of computer programming and coding are known, the mechanics of assembling the convolutional neural network (CNN) 200 are generally not discussed herein. Rather, aspects of the convolutional neural network (CNN) 200 are presented in functional terms understandable to one skilled in the art.

In this exemplary embodiment, and to provide some context, the convolutional neural network (CNN) 200 includes an input feature map 209, a convolution output layer 214, and a pooling layer 216. In this example, the input feature map 209 includes a three-dimensional input volume. The input feature map 209 is characterized by dimensions of $N \times N \times D$, where N represents height and width of the input, and D, represents depth of the input (for example, a number of hidden layers associated with the input feature map 209). A plurality of filters 211 are used to filter the input feature map 209. Each filter 211 is characterized by dimensions of $k \times k \times D$, where the additional variable, k, represents height and width of each filter 211. In this example, the height and the width of the input feature map 209 as well as each filter 211 are equivalent, and therefore the respective components are square. However, this is merely for simplicity and it should be recognized that the input feature map 209 and/or the filter 211 may be rectangular (and therefore the width may differ from the height for each of the respective components).

In operation of the convolutional neural network (CNN) 200, each filter 211 is shifted in a sliding window like fashion across the input feature map 209. The amount of shift is referred to as the "stride length," or simply as the "stride," s. During each shift, respective weighting belonging to a given filter 211 is multiplied and added with every pair-wise input element from the overlapping region of the input volume to provide convolution 212. After convolution 212, optional pooling layer 216 is used to subsample the convolved output by sliding a two-dimensional window across the three-dimensional convolved output and selecting the maximum (or average) value 215 over the window. In this example, the optional pooling layer 216 is defined by parameters p and s, where $p \times p$ defined the region for the pooling operation, and s represents the stride for the filter 211.

A given neural network is parameterized by the weights for each dimension of feature detectors. The learning process for each neural network involves learning those parameters from a set of training data such as images. Typically, training makes use of techniques such as back-propagation. Unfortunately, given the nonlinearity of the neural network and the potentially huge number of weight parameters (a robust neural network may include more than 1 million parameters), a trained neural network typically falls in local optimum. Even worse, when there is insufficient training data available, the resulting neural network is prone to over-fitting. That is, the neural network will work well on the training data but poorly on data not observed in the training set.

Accordingly, improved techniques for training in neural network are disclosed herein. The techniques increase the number of effective feature detectors that lead to a more effective deep neural network. The techniques provide for disabling of a subset of feature detectors during the training process, where the disabling signal can be generated randomly for each layer of the network (random switch) and propagated to the next layer hierarchically (connection based switch). During testing, the entire neural network is used. The techniques are described in greater detail with regards to FIG. 3, FIG. 4, and FIG. 5.

Figure 3:
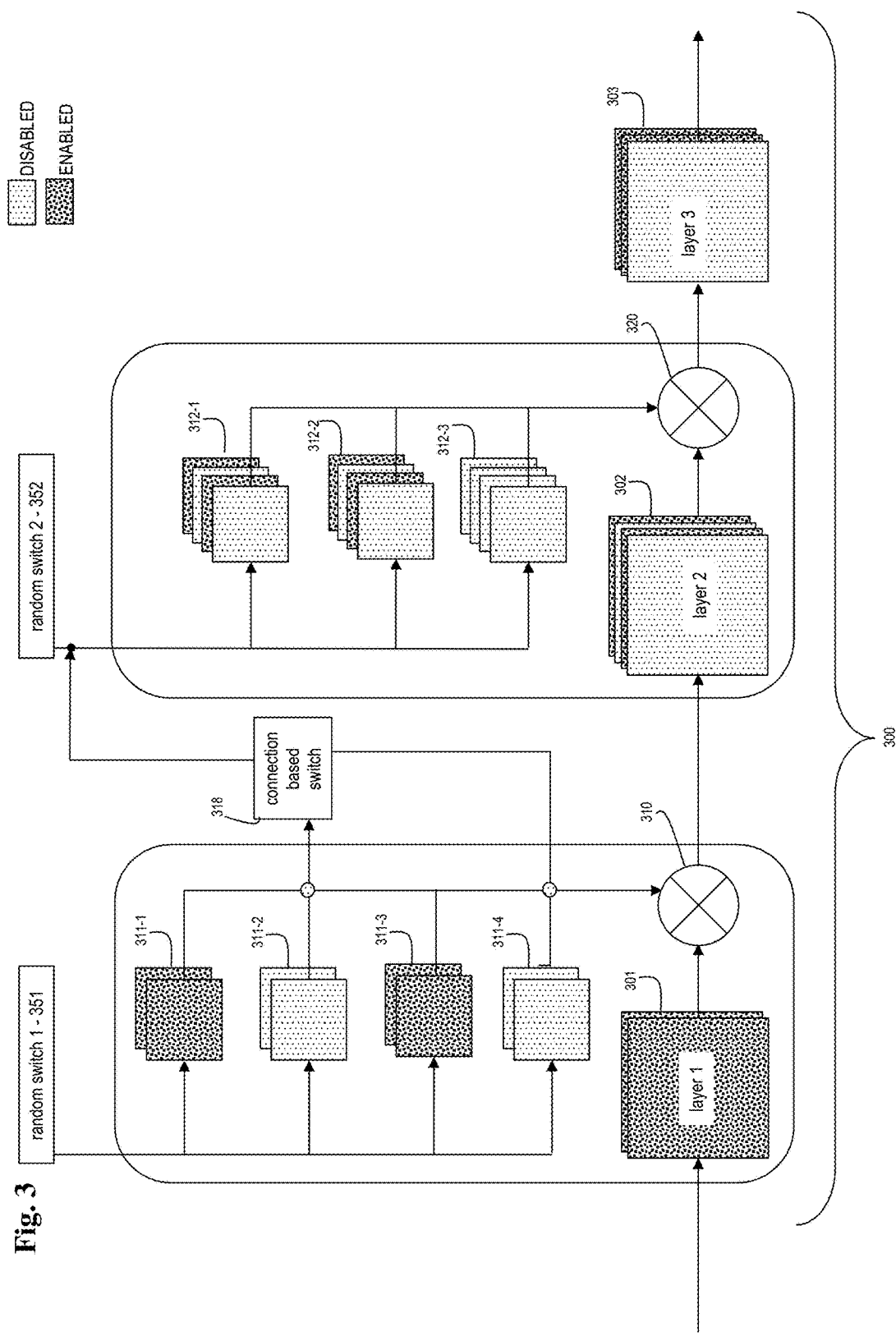
FIG. 3 is diagram depicting aspects of a forward propagation process for training a neural network.
Figure 4:
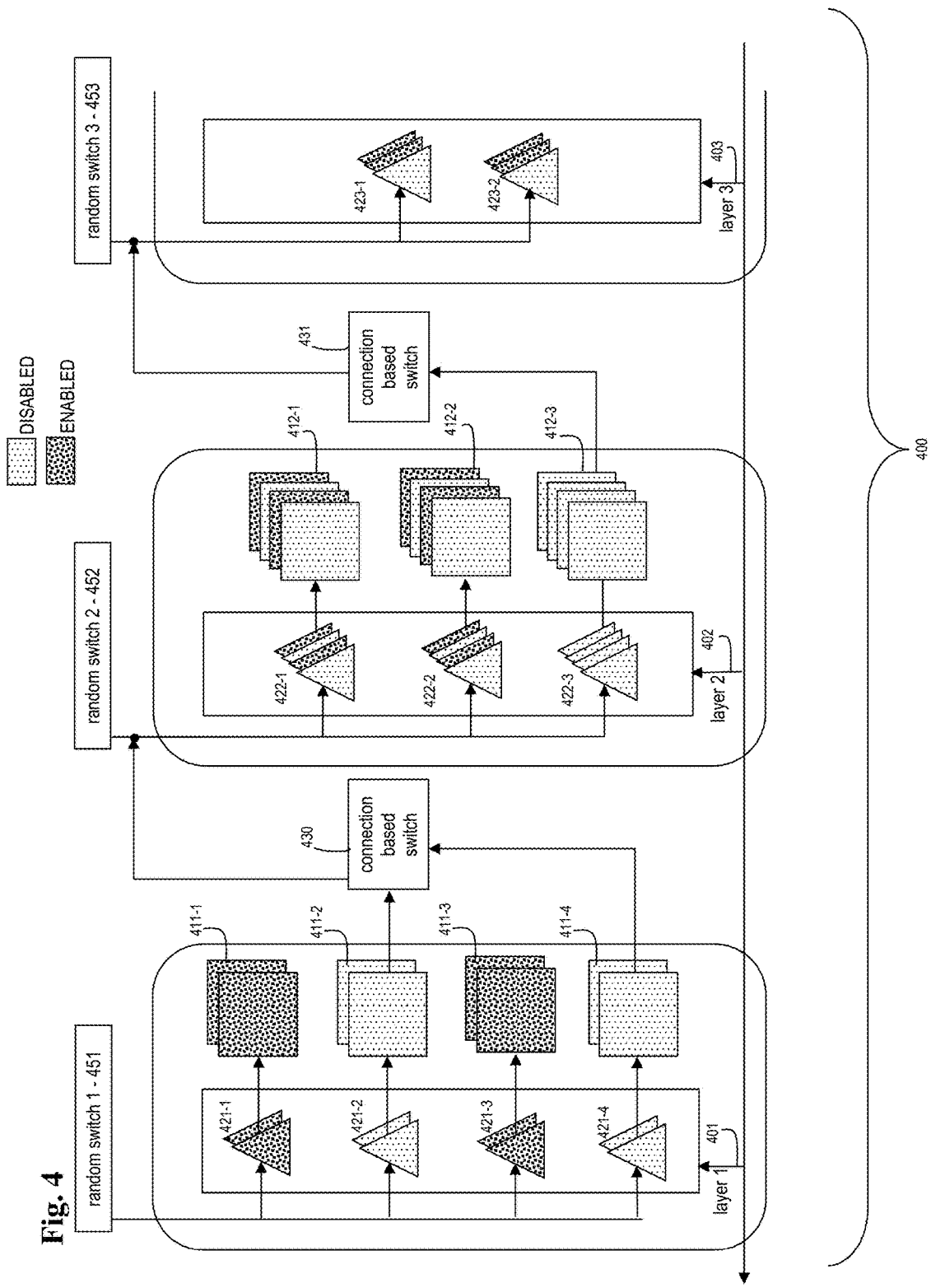
FIG. 4 is diagram depicting aspects of a back propagation process for training the neural network.
Figure 5:
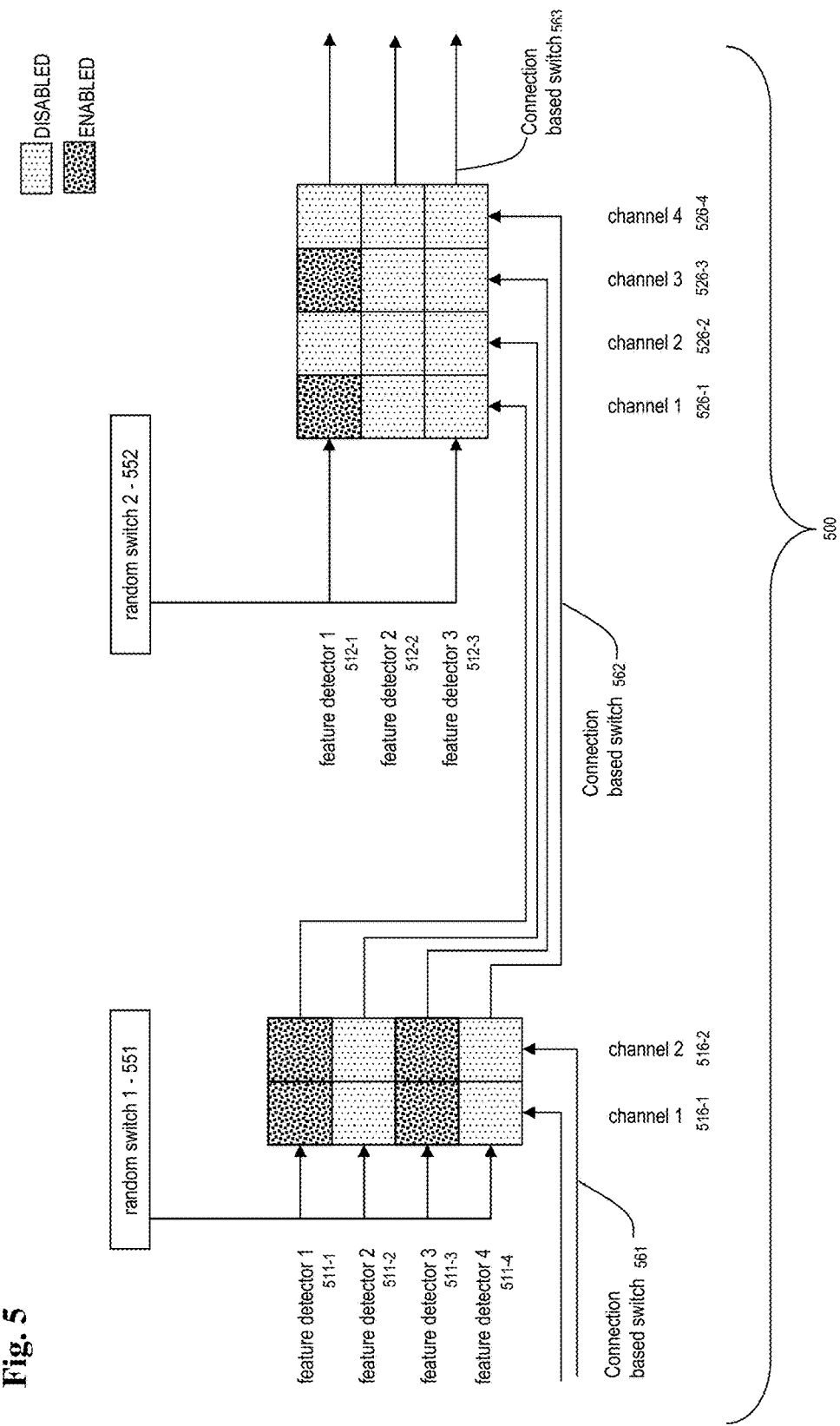
FIG. 5 is a diagram depicting aspects of propagation of switches used in the training process.

FIG. 3 is a schematic diagram that provides an abstraction of an instance of training by feedforward propagation. In the feedforward propagation model, a batch of training data is input to the neural network 300. The training data may include a single data, a subset of data or an entire set of training data. Note, that FIG. 3, FIG. 4, and FIG. 5 illustrate only portions of a given neural network.

In this illustrative embodiment of the neural network 300, a first layer 301, a second layer 302, and a third layer 303 are shown. The first layer 301 includes four (4) feature detectors 311. The feature detectors of the first layer 311 are denoted as 311-1 (for a first feature detector), 311-2 (for a second feature detector), 311-3 (for a third feature detector), and 311-4 (for a fourth feature detector). In this example, each feature detector 311 includes two (2) channels. The second layer 302 includes three (3) feature detectors 312. The feature detectors of the second layer 312 are denoted as 312-1 (for a first feature detector), 312-2 (for a second feature detector), and 312-3 (for a third feature detector). In this example, each feature detector 312 includes four (4) channels. Weights and biases are applied in the respective convolutional layers (that is, the first convolutional layer 310, the second convolutional layer 320, and so on).

Each layer includes a random switch for disabling a subset of the feature detectors. In the illustration, the first layer 301 includes random switch 1, denoted as 351. The second layer 302 includes random switch 2, denoted as 352. Output of the first layer 301 is propagated to the next layer through connection based switch 318.

During training, a subset of feature detectors is disabled for the current layer under consideration. As a result, the responses of disabled feature detectors will be zero, and thus will not contribute to the learning exercise for the current batch of training data. By taking advantage of respective switching for each layer, the disabling process is conducted hierarchically by exploiting the structure of the neural network, such that the disabling of feature detectors in the current layer is based on the results of disabled feature detectors in the previous layer (connection based switch 318), plus an optional random switch. The disabling information of the current layer will then be propagated to the next layer. Thus, the disabling process is applied layer by layer, in a hierarchical way throughout the neural network (from the layer that is close to the input to the layer that is close to the output).

FIG. 4 is a schematic diagram that provides an abstraction of an instance of training by back-propagation. In the back-propagation model, a batch of training data is input to the neural network 400.

In this illustrative embodiment of the neural network 400, a first layer 401, a second layer 402, and a third layer 403 are shown. The first layer 401 includes four (4) feature detectors 411. The feature detectors of the first layer 411 are denoted as 411-1 (for a first feature detector), 411-2 (for a second feature detector), 411-3 (for a third feature detector), and 411-4 (for a fourth feature detector). In this example, each feature detector 411 includes two (2) channels. The second layer 402 includes three (3) feature detectors 412. The feature detectors of the second layer 412 are denoted as 412-1 (for a first feature detector), 412-2 (for a second feature detector), and 412-3 (for a third feature detector). In this example, each feature detector 412 includes four (4) channels.

In back-propagation, training of the neural network 400 may include an optimization method such as gradient descent. Gradient descent calculates the gradient of a loss function with respect to all the weights in the neural network 400. Gradients are used to update the feature detectors. Accordingly, each gradient has the same number of dimensions as the feature detector. The gradient is fed to the optimization method which in turn uses it to update the weights, in an attempt to minimize the loss function. The gradient associated with each layer 401, 402, 403 is illustrated in FIG. 4. That is, the gradient associated with the first feature detector 411-1 of the first layer 401 is denoted in FIG. 4 as 421-1. The gradient associated with the second feature detector 411-2 is denoted as 421-2, and so on. The gradient associated with the first feature detector 412-1 of the first layer 402 is denoted as 422-1, and so on.

FIG. 5 is another schematic diagram depicting a relationship of switching in another embodiment of the neural network. In this example of the neural network 500, random switch 1 551, for the first layer, provides for switching of associated feature detectors 511, and the various channels 516 associated with each respective feature detector 511. As may be seen by the shading within FIG. 5, in the first layer, feature detector 2 511-2, and feature detector 4 511-4, have been disabled. Output of the first layer feature detectors 511 is associated with channels 526 of feature detectors 512 in the second layer. Inherently, a null output of, for example, the second feature detector 511-2 in the first layer propagates to the channel 2 526-2 of the second layer (referred as the connection based switch 562). Random switch 2 552 of the second layer may also randomly selecting and disable feature detectors of the second layer, such as feature detector 3 512-3.

In the back-propagation training process, each gradient is computed for a corresponding feature detector. Selection and disabling of feature detectors is applied to the respective gradients, which are then used to update the feature detectors. Gradients in a given layer are also used to compute the gradients for the previous layer.

As example shown in FIG. 4, the gradient is computed (421-1, 421-3) when the corresponding feature detectors are not disabled (411-1, 411-3) by the switch signal, which can be generated by the connection based switch (430, 431) and/or the random switch (451, 452, 453). In the meanwhile, the gradient (421-2, 421-4) is set to 0 when the corresponding feature detectors are disabled (411-1, 411-3) by the switch signal. The computed gradient (421-1, 421-3) is then applied to update the feature detectors, if they are selected and not disabled (411-1, 411-3) by the switch signal, which can be connection based switch (430, 431) and/or random switch (451, 452, 453). In the meanwhile, feature detectors are not updated if they are disabled (411-1, 411-3) by the switch signal.

As shown in FIG. 5, the technique makes use of random switching to control which feature detectors remain active. A connection based switch (as shown in FIGS. 3 and 4, as elements 318, 430, 431) provides for controlling which channel of a given feature detector shall remain active. Accordingly, disabling of a particular feature detector within the neural network will propagate through the subsequent layers.

In some embodiments, after an initial batch of training data has been processed, a different subset of feature detectors may be selected or disabled. During testing, the entire set of feature detectors will be used and none of the filters will be disabled.

The technique provides for selecting a subset of network parameters for training each batch of training data. The network parameters are selected in a hierarchical process and the rest are disabled accordingly. Consistent with the Razor theorem, fewer parameters means less over-fitting. Accordingly, the neural network that operates with fewer feature detectors has a lower chance of dead or duplicated feature detectors. Combining these less parameterized (and less over-fitted) embodiments of a given neural network leads to a more effective neural network overall in testing. The technique can be also viewed as an instance of ensemble learning, where multiple models are combined (e.g., via weighted average) to form a stronger model, each of which is trained from a (randomly selected) subset of features given a (randomly selected) subset of input data. By using all parameters of the given neural network in the test stage, it can be considered as an average of all combinations of the subset of the trained neural networks.

In addition, the disclosed technique results in a more efficient training process, as fewer feature detectors are active and therefore need to be to be updated in each round of the training process.

Figure 6:
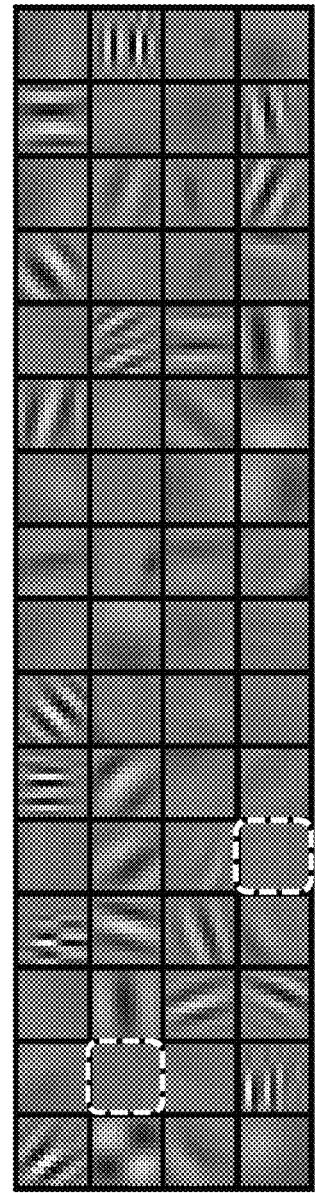
FIG. 6 is an illustration of dead filters learned by the neural network.

Referring to FIG. 6, there is shown an illustration of the filters within a first convolution layer. In this illustration, each cell shows a filter in RGB space. Two (2) of the filters within the first convolution layer are dead filters. That is, a dead filter may be seen at each of the second row, second column in the fourth row, fifth column. Each of these filters lacks structure and pattern. Note that the dead filters are surrounded by a dashed line for clarity. Another example of the filters is shown in FIG. 7.

Figure 7B:
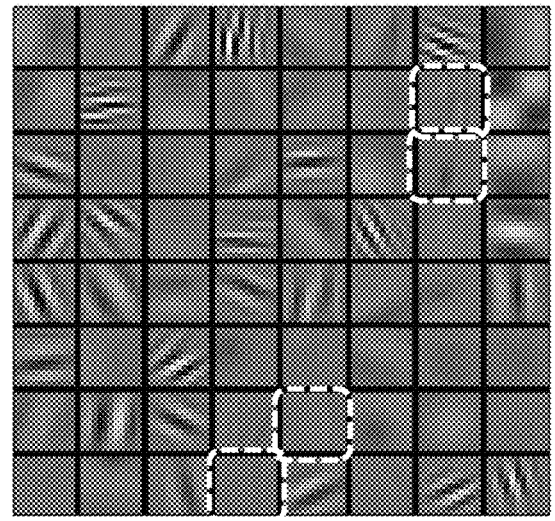
Figure 7A:
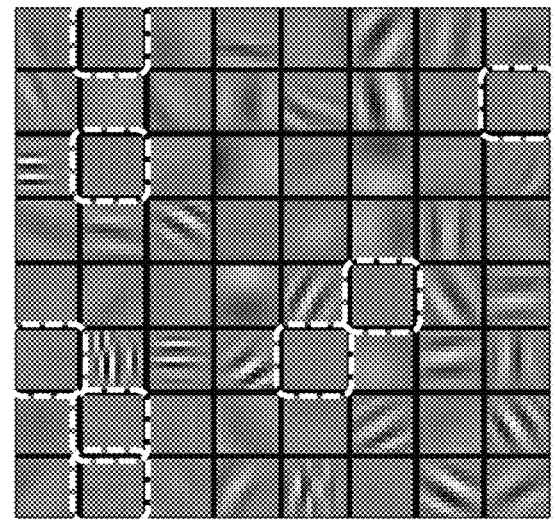

In FIG. 7, a comparison of dead filters with and without the disclosed technology is shown for the first convolution layer. FIG. 7A depicts an embodiment of a neural network that has been trained by use of conventional techniques. FIG. 7B depicts an embodiment of a neural network that has been trained according to the techniques disclosed herein. Similar to FIG. 6, the dead filters in FIG. 7A and FIG. 7B are highlighted by a dashed line. As may be seen by reference to FIG. 7, a substantial improvement in performance of the neural network is realized.

In order to prove efficacy of the techniques disclosed herein, an embodiment of a neural network was trained accordingly. Training involved image classification using images from the ImageNet 2014 challenge. The ImageNet 2014 challenge was to identify a learning model to classify images into 1,000 visual categories. For training, about 1.2 million images are available, with about 1200 images for each category; for testing, about 5,000 images with ground truth labels. Drop all layers were added after each convolution layer in fully connected layer. The top-5 accuracy performance metric was used, where the model reports the top five (5) predictions of visual category for the testing image. If any of the prediction hit the ground truth category, it was marked as a correct instance. Otherwise, the prediction was marked as a failure, and the percentage of the correct instances were computed and reported as accuracy.

For the experiment, a standard protocol of existing works was followed, where each RGB image was scaled with the aspect ratio kept such that the minimum of height and width is equal to 256. A 224×224 region was randomly cropped during training. Multiple views (10 views) were applied during testing, and the learning rate was set to 0.01 at the beginning and decreased to 0.0001 in the end. The learning process was terminated after 90 epochs.

For comparison, two different neural networks of the same architecture were used. The first neural network was trained using prior art techniques. The second neural network was trained applying techniques disclosed herein. The experiment shows a 6.64% improvement on top-5 accuracy for the second network compared with the first network. This further indicates the disclosed technology with dual switching mechanisms enhance the network performance.

Figure 8:
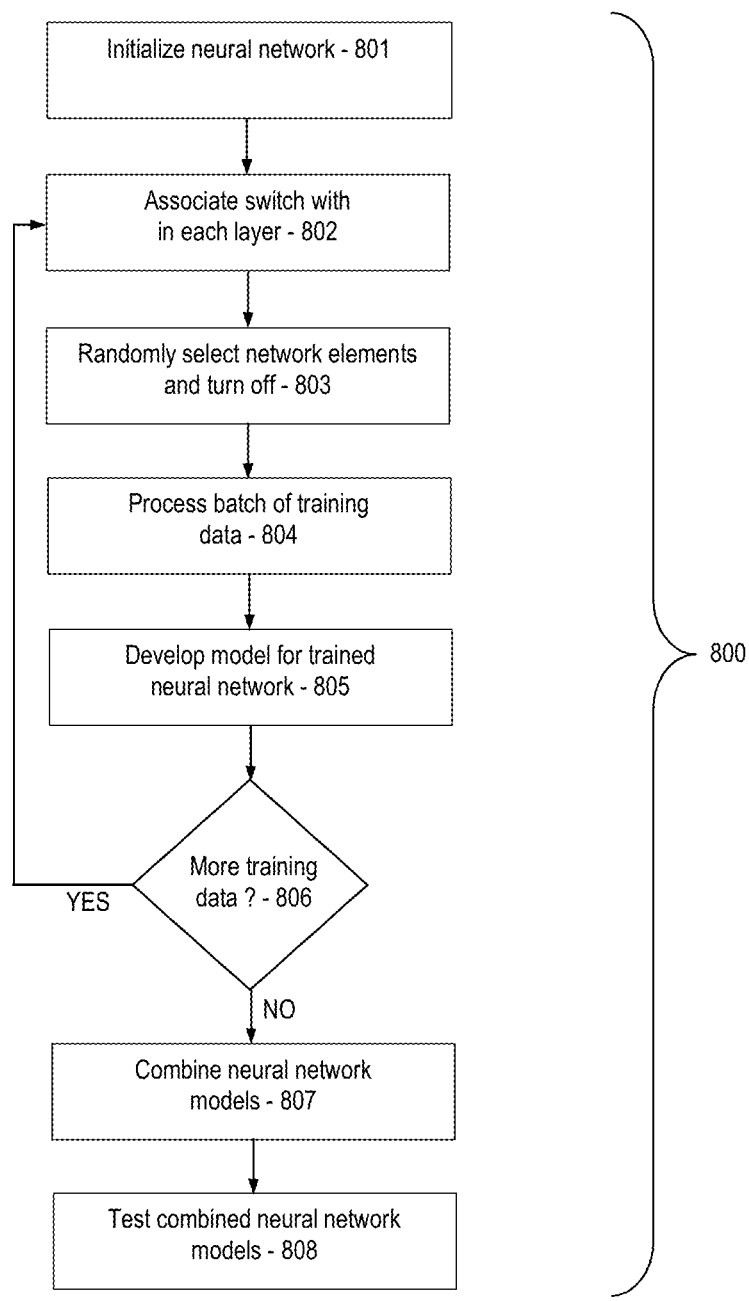
FIG. 8 is a flowchart depicting an illustrative embodiment of a method for training a neural network.

FIG. 8 is a flowchart that depicts an illustrative embodiment of a method for training a neural network 800. In a first step 801, the neural network is initialized. In a second step 802, a switch is associated with components of a plurality of layers within the neural network. The components may include feature detectors, gradients and/or other components used in the processing. In a third step 803, selection of the components is made based on dual switching mechanisms (i.e., the random switch and the connection-based switch), such that part of components are switched off. In a fourth step 804, a batch of training data is input into the neural network. The batch of training data may include a single image, portions of an image, and upwards of many images. In a fifth step 805, a model for the neural network that results from the processing of the training data is developed. In a sixth step 806, inquiry as to the availability of additional training data is made. If there is additional training data, the neural network continues being trained. However, the dual switch signals are reset such that another part of components are disabled and the first five steps are performed again. When the training data has been exhausted, the method proceeds to a seventh step 807. In the seventh step 807, all the components are used, equally meaning that the various models given different subsets of components of the neural network are combined. In an eighth step 808, once the various models of the neural network have been combined, test data is input into the neural network. The test data may include new data, at least some of the training data, and/or all of the original training data.

Advantageously, the techniques disclosed herein enable learning of the neural network with less bad feature detectors or duplicated feature detectors compared to the prior art. Moreover, the resulting neural network is more efficient. For example, the training process results in the need to update fewer feature detectors during the generation. The techniques take the benefits of ensemble learning by combining all subsets of the network.

Further, only minor modifications to a neural network are required to implement the techniques disclosed herein.

Various other components may be included and called upon for providing for aspects of the teachings herein. For example, additional materials, combinations of materials and/or omission of materials may be used to provide for added embodiments that are within the scope of the teachings herein.

When introducing elements herein, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the subject matter presented has been described with reference to exemplary embodiments, it will be understood by those skilled in the art that various changes may be made and equivalents may be substituted for elements thereof without departing from the intended scope. In addition, many modifications will be appreciated by those skilled in the art to adapt a particular instrument, situation or material to the teachings of the invention without departing from the essential scope thereof. Therefore, it is intended that the technology presented not be limited to the particular embodiments disclosed as the best mode, but that the appended claims will more.

What is claimed is:

1. A method to train a neural network, the method comprising:

selecting, using a processor, a first subset of feature detectors from a plurality of feature detectors of a first layer of a neural network, the first subset of feature detectors and a second subset of feature detectors forming the plurality of feature detectors of the first layer;

disabling each feature detector of the first subset of feature detectors;
enabling each feature detector of the second subset of feature detectors;
selecting a third subset of feature detectors from a plurality of feature detectors of a second layer of the neural network, the second layer being closer to an output of the neural network than the first layer, the third subset of feature detectors and a fourth subset of feature detectors forming the plurality of feature detectors of the second layer, the feature detectors of the third subset of feature detectors being connected to each disabled feature detector of the first subset of feature detectors;
disabling each feature detector of the third subset of feature detectors;
enabling each feature detector of the fourth subset of feature detectors;
inputting training data into the neural network with the first subset and the third subset of feature detectors disabled and the second subset and the fourth subset of feature detectors enabled;
backpropagating data output from the neural network in response to inputting the training data into the neural network with the first subset and the third subset of feature detectors disabled and the second subset and the third subset of feature detectors enabled; and
updating at least one feature detector of at least one of the second subset and the fourth subset of feature detectors based on an optimization of a loss function.

2. The method of claim 1, wherein the third subset of feature detectors further comprises the feature detectors that are connected to each disabled feature detector of the first subset of feature detectors and at least one feature detector selected from a remaining feature detector of the plurality of feature detectors of the second layer.

3. The method of claim 1, wherein updating the at least one feature detector further comprises updating the at least one feature detector of at least one of the second subset and the fourth subset of feature detectors based on a gradient descent associated with each updated feature detector.

4. The method of claim 3, wherein updating the at least one feature detector further comprises:
updating at least one feature detector of the second subset of feature detectors based on a gradient descent of the updated feature detector of the second subset of feature detectors; and
updating at least one feature detector of the fourth subset of feature detectors based on a gradient descent of the updated feature detector of the fourth subset of feature detectors.

5. The method of claim 1, wherein selecting the first subset of feature detector comprises randomly selecting the first subset of feature detectors.

6. The method of claim 1, wherein the feature detectors of at least one of the first layer and the second layer comprises a plurality of channels.

7. The method of claim 6, wherein the feature detectors of the first layer comprises a plurality of channels and the feature detectors of the second layer comprises a plurality of channels.

8. A system, comprising:
a processor programmed to initiate executable operations to train a neural network comprising:
selecting a first subset of feature detectors from a plurality of feature detectors of a first layer of the neural network, the first subset of feature detectors and a second subset of feature detectors forming the plurality of feature detectors of the first layer;
disabling each feature detector of the first subset of feature detectors;
enabling each feature detector of the second subset of feature detectors;
selecting a third subset of feature detectors from a plurality of feature detectors of a second layer of the neural network, the second layer being closer to an output of the neural network than the first layer, the third subset of feature detectors and a fourth subset of feature detectors forming the plurality of feature detectors of the second layer, the feature detectors of the third subset of feature detectors being connected to each disabled feature detector of the first subset of feature detectors;
disabling each feature detector of the third subset of feature detectors;
enabling each feature detector of the fourth subset of feature detectors;
inputting training data into the neural network with the first subset and the third subset of feature detectors disabled and the second subset and the fourth subset of feature detectors enabled;
backpropagating data output from the neural network in response to inputting the training data into the neural network with the first subset and the third subset of feature detectors disabled and the second subset and the third subset of feature detectors enabled; and
updating at least one feature detector of at least one of the second subset and the fourth subset of feature detectors based on an optimization of a loss function.

9. The system of claim 8, wherein the third subset of feature detectors further comprises the feature detectors that are connected to each disabled feature detector of the first subset of feature detectors and at least one feature detector selected from a remaining feature detector of the plurality of feature detectors of the second layer.

10. The system of claim 8, wherein updating the at least one feature detector further comprises updating the at least one feature detector of at least one of the second subset and the fourth subset of feature detectors based on a gradient descent associated with each updated feature detector.

11. The system of claim 10, wherein updating the at least one feature detector further comprises:
updating at least one feature detector of the second subset of feature detectors based on a gradient descent of the updated feature detector of the second subset of feature detectors; and
updating at least one feature detector of the fourth subset of feature detectors based on a gradient descent of the updated feature detector of the fourth subset of feature detectors.

12. The system of claim 8, wherein selecting the first subset of feature detector comprises randomly selecting the first subset of feature detectors.

13. The system of claim 8, wherein the feature detectors of at least one of the first layer and the second layer comprises a plurality of channels.

14. The system of claim 13, wherein the feature detectors of the first layer comprises a plurality of channels and the feature detectors of the second layer comprises a plurality of channels.

15. A non-transitory computer-readable medium having stored thereon instructions that, if executed by a processor, result in at least the following:

selecting, a first subset of feature detectors from a plurality of feature detectors of a first layer of a neural network, the first subset of feature detectors and a second subset of feature detectors forming the plurality of feature detectors of the first layer;

disabling each feature detector of the first subset of feature detectors;

enabling each feature detector of the second subset of feature detectors;

selecting a third subset of feature detectors from a plurality of feature detectors of a second layer of the neural network, the second layer being closer to an output of the neural network than the first layer, the third subset of feature detectors and a fourth subset of feature detectors forming the plurality of feature detectors of the second layer, the feature detectors of the third subset of feature detectors being connected to each disabled feature detector of the first subset of feature detectors;

disabling each feature detector of the third subset of feature detectors;

enabling each feature detector of the fourth subset of feature detectors;

inputting training data into the neural network with the first subset and the third subset of feature detectors disabled and the second subset and the fourth subset of feature detectors enabled;

backpropagating data output from the neural network in response to inputting the training data into the neural network with the first subset and the third subset of feature detectors disabled and the second subset and the third subset of feature detectors enabled; and updating at least one feature detector of at least one of the second subset and the fourth subset of feature detectors based on an optimization of a loss function.

16. The non-transitory computer-readable medium of claim 15, wherein the third subset of feature detectors further comprises the feature detectors that are connected to each disabled feature detector of the first subset of feature detectors and at least one feature detector selected from a remaining feature detector of the plurality of feature detectors of the second layer.

17. The non-transitory computer-readable medium of claim 15, wherein updating the at least one feature detector further comprises updating the at least one feature detector of at least one of the second subset and the fourth subset of feature detectors based on a gradient descent associated with each updated feature detector.

18. The non-transitory computer-readable medium of claim 17, wherein updating the at least one feature detector further comprises:

updating at least one feature detector of the second subset of feature detectors based on a gradient descent of the updated feature detector of the second subset of feature detectors; and updating at least one feature detector of the fourth subset of feature detectors based on a gradient descent of the updated feature detector of the fourth subset of feature detectors.

19. The non-transitory computer-readable medium of claim 15, wherein selecting the first subset of feature detector comprises randomly selecting the first subset of feature detectors.

20. The non-transitory computer-readable medium of claim 15, wherein the feature detectors of at least one of the first layer and the second layer comprises a plurality of channels.

* * * * *